United States Patent
Aronov et al.

(10) Patent No.: US 9,368,984 B2
(45) Date of Patent: Jun. 14, 2016

(54) METHOD AND DEVICE FOR FAST-CHARGING OF RECHARGEABLE BATTERIES

(71) Applicant: StoreDot Ltd., Herzeliya (IL)

(72) Inventors: Daniel Aronov, Netanya (IL); Leonid Krasovitsky, Rishon LeTzion (IL); Doron Burshtain, Herzeliya (IL)

(73) Assignee: StoreDot Ltd., Herzeliya (IL)

( * ) Notice: Subject to any disclaimer, the term of this patent is extended or adjusted under 35 U.S.C. 154(b) by 0 days.

(21) Appl. No.: 14/811,933

(22) Filed: Jul. 29, 2015

(65) Prior Publication Data

US 2016/0036255 A1 Feb. 4, 2016

Related U.S. Application Data

(60) Provisional application No. 62/030,095, filed on Jul. 29, 2014.

(51) Int. Cl.
*H02J 7/00* (2006.01)
*H02J 7/14* (2006.01)

(52) U.S. Cl.
CPC ............ *H02J 7/0036* (2013.01); *H02J 7/0021* (2013.01); *H02J 7/00* (2013.01); *H02J 7/007* (2013.01);

(Continued)

(58) Field of Classification Search
USPC ......... 320/132, 134, 165, 126, 136, 139, 150, 320/152, 162, 107, 137, 160, 116, 118, 149, 320/106, 109, 125, 128, 157, 124, 140, 141, 320/142, 163, 167, 117, 129, 133, 145, 151, 320/158; 324/426, 427, 432, 428, 429, 430, 324/433; 702/63, 182
See application file for complete search history.

(56) References Cited

U.S. PATENT DOCUMENTS 7,394,225 B2 *  7/2008  Guang .................. H02J 7/0006
                                                      320/117
7,728,552 B2 *  6/2010  Burns .................... H02J 7/0021
                                                      320/106

(Continued)

FOREIGN PATENT DOCUMENTS

CH   WO 2014029880 A3 *  9/2014  ............ A24F 47/008

OTHER PUBLICATIONS

Cadex Electronic "BU-808: How to prolong Lithium-based Batteries" Batteries Universities http://www.batteryuniversity.com/learn/article/how_to_prolong_lithium_based_batteries Last updated Apr. 29, 2015.

(Continued)

*Primary Examiner* — Alexis A Boateng
(74) *Attorney, Agent, or Firm* — Pearl Cohen Zedek Latzer Baratz LLP

(57) ABSTRACT

A system and method for fast charging of a lithium-ion battery, including: continuously monitoring a state of charge (SOC) of the lithium-ion battery; during a normal mode of operation and upon detecting that the battery is at the predetermined low charge level, discontinuing the discharge; upon detecting that the battery is connected to a charger, providing charging rate of at least 4 C for at least part of charging; and upon detecting that the battery, while connected to the charger is at the predetermined high charge level, discontinue the charging, wherein the predetermined low charge level and the predetermined high charge level define a consumable capacity of the battery, wherein the consumable capacity is below 50% of the full capacity of the battery.

16 Claims, 4 Drawing Sheets

(52) U.S. Cl.
CPC ............... *H02J 7/008* (2013.01); *H02J 7/0078* (2013.01); *H02J 2007/004* (2013.01); *H02J 2007/0037* (2013.01)

(56) References Cited

U.S. PATENT DOCUMENTS

| | | | | |
|---|---|---|---|---|
| 2009/0058370 A1* | 3/2009 | Odaohhara | ............. | H02J 7/047 320/152 |
| 2012/0200266 A1* | 8/2012 | Berkowitz | .......... | B60L 11/1861 320/139 |
| 2012/0306450 A1* | 12/2012 | Nakayama | ............. | G06F 1/263 320/134 |
| 2014/0167656 A1* | 6/2014 | Yamada | ............. | G01R 31/3624 318/139 |
| 2014/0184172 A1* | 7/2014 | Momo | .................. | H02J 7/0057 320/160 |
| 2014/0266068 A1* | 9/2014 | O'Brien | ................ | H02J 7/0093 320/139 |
| 2014/0361732 A1* | 12/2014 | Nishikawa | ............ | H02J 7/0014 320/107 |
| 2015/0181942 A1* | 7/2015 | Holzherr | ............... | A24F 47/008 131/328 |
| 2015/0288206 A1* | 10/2015 | Aronov | .................. | H02J 7/0044 320/114 |

OTHER PUBLICATIONS

Gang Ning et al. "Capacity fade study of lithium-ion batteries cycled at high discharge rates" Journal of Power Sources 117 (2003) pp. 160-169, May 2003.

* cited by examiner

METHOD AND DEVICE FOR FAST-CHARGING OF RECHARGEABLE BATTERIES

CROSS-REFERENCE TO RELATED APPLICATIONS

This application claims the benefit of U.S. Provisional Application Ser. No. 62/030,095, filed Jul. 29, 2014, which is hereby incorporated by reference in its entirety.

FIELD OF THE INVENTION

The present invention relates to a method and device for fast-charging of rechargeable batteries.

BACKGROUND

To meet the growing demand in portable electronic devices, energy storage devices with high specific energy, high power density, long cycle-life, low cost, and a high margin of safety may be employed. Currently, the dominant energy storage device remains the battery, particularly the lithium-ion (Li-ion) battery. Batteries store energy electrochemically, in which chemical reactions release electrical carriers that can be extracted into an electrical circuit. During discharge, the energy-containing lithium ions travel from a high-energy anode material through a separator to a low-energy cathode material. The movement of the lithium ions releases energy, which is extracted into an external circuit.

During battery charging, energy is used to move the lithium ions back to the high-energy anode compound. The charge and discharge process in batteries is a slow process, and can degrade the chemical compounds inside the battery over time. A key bottleneck in achieving enhanced performance is the limited fast-charging ability of any standard battery. Rapid charging causes accelerated degradation of the battery constituents, as well as a potential fire hazard due to a localized, over-potential build-up and increased heat generation.

For example, lithium-ion batteries currently having the highest energy density of rechargeable batteries available, typically suffer from a low power by virtue of reversible Coulombic reactions occurring at both electrodes, involving charge transfer and ion diffusion in bulk electrode materials. Since both diffusion and charge transfer are slow processes, power delivery as well as the recharge time of lithium-ion batteries is kinetically limited. As a result, batteries have a low power density, and lose their ability to retain energy throughout their lifetime due to material degradation.

SUMMARY

According to some embodiments of the present invention, there is provided a system for fast charging of a lithium-ion battery, the system may include: a power management module configured to: continuously monitor a state of charge (SOC) of the lithium-ion battery; during a normal mode of operation and upon detecting that the battery is at the predetermined low charge level, discontinuing discharge of the battery; upon detecting that the battery is connected to a charger, providing charging rate of at least 4 C for at least part of charging of the battery; and upon detecting that the battery, while connected to the charger, is at the predetermined high charge level, discontinuing the charging, wherein the predetermined low charge level and the predetermined high charge level define a consumable capacity of the battery, wherein the consumable capacity is below 50% of the full capacity of the battery.

Furthermore, according to some embodiments of the present invention, the system may include the battery.

Furthermore, according to some embodiments of the present invention, the predetermined low charge level, the predetermined high charge level and the charging rate are set so that an expected cycle-life of the battery is at least about 1200 cycles.

Furthermore, according to some embodiments of the present invention, the battery may include a plurality of battery cells connected in parallel.

Furthermore, according to some embodiments of the present invention, the capacity of the battery is three times larger than the consumable capacity.

Furthermore, according to some embodiments of the present invention, the power management module may be further configured to provide an initial charging rate of substantially 6 C for at least 60 seconds of the charging, a charging rate of 0.5 C for a second charging phase afterwards.

Furthermore, according to some embodiments of the present invention, the predetermined low charge level and the predetermined high charge level define an operational range that may be within 30-100% of the full capacity.

Furthermore, according to some embodiments of the present invention, the power management module may be further configured to: enable an emergency use mode to a user; and upon activation of the emergency use mode, enable up to 100% depth of discharge of the battery.

Furthermore, according to some embodiments of the present invention, the system may include a charger, wherein the power management module may be further configured to provide the charging rate of at least 4 C for at least part of charging of the battery by instructing the charger to provide the required current level.

According to some embodiments of the present invention, there is provided a method for fast charging of a lithium-ion battery, the method may include: continuously monitoring a state of charge (SOC) of the lithium-ion battery; during a normal mode of operation and upon detecting that the battery is at the predetermined low charge level, discontinuing the discharge; upon detecting that the battery is connected to a charger, providing charging rate of at least 4 C for at least part of charging; and upon detecting that the battery, while connected to the charger is at the predetermined high charge level, discontinue the charging, wherein the predetermined low charge level and the predetermined high charge level define a consumable capacity of the battery, wherein the consumable capacity is below 50% of the full capacity of the battery.

According to some embodiments of the present invention, there is provided a system for fast charging of a lithium-ion battery, the system may include: a controller configured to: detect a state of charge of the lithium-ion battery; limit the battery charge and discharge levels during normal mode of operation to a predetermined operational range; and provide an initial charging rate of at least 4 C for an initial phase of charging, wherein the operational range define a consumable capacity of the battery, which is below 50% of a full capacity of the battery.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
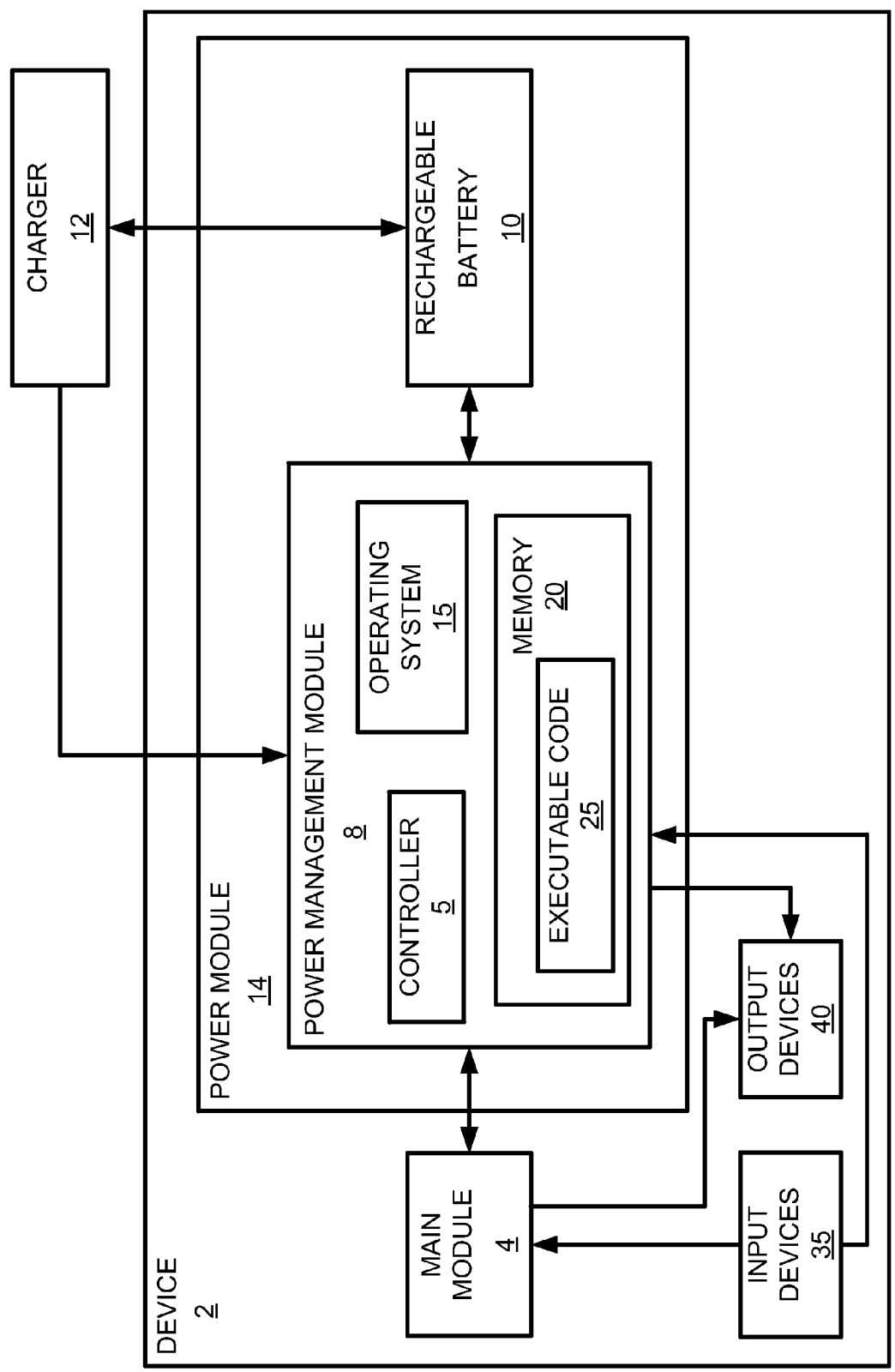
FIG. 1 is a high-level schematic diagram illustrating a battery system according to embodiments of the present invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the invention may enable fast charging of a rechargeable battery, for example a lithium-ion rechargeable battery. According to embodiments of the present invention, the consumable capacity of the battery may be limited, and fast charging rates may be provided, e.g. at least 4 C, where a rate of 1 C charges the battery with the consumable capacity in one hour. The "C rate" used herein may define the current needed to fully charge a specific battery with capacity C in one hour. For example, a 1 C rate for a 2600 mAh (milliampere hour) battery is applying 2600 mA (milliampere) for one hour to fully charge the battery. Therefore, a 6 C rate for the same battery is applying 15.6 A for 10 minutes to fully charge the battery. The rate of charging is not limited to integer numbers and can be, by way of example, 2.5 C. Limiting the consumable capacity of the battery may extend the cycle-life of the battery, while using very high charging current may reduce the cycle-life of the battery. Combining both effects may provide a trade-off between extending and reducing the cycle-life of the battery, while enabling very fast charging rates.

Reference is made to FIG. 1, depicting a schematic diagram illustrating a fast charging battery system according to some embodiments of the present invention. The fast charging battery system may include a power module 14 embedded in a device 2 and a charger 12. The main components of power module 14 may include a power-management module 8, and a battery 10 operationally connected to each other. Power module 14 may include other circuitry as may be required. Device 2 may include or may be a mobile device, a cellular phone, a smart phone, a tablet computer, a laptop personal computer (PC), an electrical vehicle or any other applicable device including a rechargeable battery. Device 2 may further include a main module 4 coupled to power management module 8 for activating and managing device 2, input devices 35 and output devices 40, and other components. Main module 4 may be, or may include, a controller or processor, e.g., similar to controller 5, a memory e.g., similar to memory 20, and executable code, e.g., similar to executable code 25.

Power management module 8 may include a controller 5 that may be, for example, a central processing unit processor (CPU), a chip or any other suitable multi-purpose or specific processor or controller, an operating system 15, a memory 20 and executable code 25. Controller 5 may be configured to carry out methods described herein, and/or to execute or act as the various modules, units, etc., for example by executing code or software. For example, by executing executable code 25 stored in memory 20, controller 5 may be configured to carry out a method of controlling a battery as described herein, for example by executing code or software (e.g., code 25), and/or using dedicated circuitry. Controller 5 may be configured for example to detect a state of charge of a battery, limit the battery charge and discharge levels, and control charging rates as disclosed herein. Parameters for controlling the battery may for example be stored in memory 20.

Operating system 15 may be or may include any code segment (e.g., one similar to executable code 25 described herein) designed and/or configured to perform tasks involving coordination, scheduling, arbitration, supervising, controlling or otherwise managing operation of power management module 8, for example, scheduling execution of software programs or enabling software programs or other modules or units to communicate. Operating system 15 may be a commercial operating system.

Memory 20 may be or may include, for example, a Random Access Memory (RAM), a read only memory (ROM), a Dynamic RAM (DRAM), a Synchronous DRAM (SD- RAM), a double data rate (DDR) memory chip, a Flash memory, an electrically erasable programmable read-only memories (EEPROMs) a volatile memory, a non-volatile memory, a cache memory, a buffer, a short term memory unit, a long term memory unit, or other suitable memory units or storage units. Memory 20 may be or may include a plurality of, possibly different memory units. Memory 20 may be a computer or processor non-transitory readable medium, or a computer non-transitory storage medium, e.g., a RAM. Memory 20 may be or include a storage unit. Memory 20 may be common to power management module 8 and main module 4.

Executable code 25 may be any executable code, e.g., an application, a program, a process, task or script. Executable code 25 may be executed by controller 5 possibly under control of operating system 15. For example, executable code 25 may be an application for fast charging and controlling of a battery as further described herein. Although, for the sake of clarity, a single item of executable code 25 is shown in FIG. 1, a system according to embodiments of the invention may include a plurality of executable code segments similar to executable code 25 that may be loaded into memory 20 and cause controller 5 to carry out methods described herein. Input devices 35 may be or may include a mouse, a keyboard, a touch screen or pad or any suitable input device. It will be recognized that any suitable number of input devices may be operatively connected to either main module 4 and/or power management module 8, as shown by block 35. Output devices 40 may include one or more displays or monitors, speakers and/or any other suitable output devices. It will be recognized that any suitable number of output devices may be operatively connected to main module 4 and/or power management module 8, as shown by block 40. Any applicable input/output (I/O) devices may be connected to main module 4 and/or power management module 8, as shown by input devices 35 and output devices 40. For example, a wired or wireless network interface card (NIC), a printer, a universal serial bus (USB) device or external hard drive may be included in input devices 35 and/or output devices 40. In some embodiments, some of the components shown in FIG. 1 may be omitted. Input devices 35 may be used for obtaining user preferences, for example, for enabling or disabling an emergency use mode of operation. It should be readily understood that this input may be provided to controller 5 by main module 4.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause the processor to carry out methods disclosed herein. For example, an article may include a storage medium such as memory 20, computer-executable instructions such as executable code 25 and a controller such as controller 5. Power management module 8 may manage the charging operations, battery charging preferences and current input related to battery 10. Power-management module 8 may provide the desired charging rate to battery 10 by instructing charger 12 to provide the required current or voltage level. A software application on memory 20, when executed by controller 5, may govern power functions responsible for the charging and discharging processes, and may enable configuration of parameters and charging preferences of power-management module 8. Power-management module 8 may further include additional units or modules including, for example, one or more timers to measure intervals of time, one or more analog to digital converters to obtain readings of one or more sensors. The sensors may detect various parameters related to the state of battery 10 including, for example, voltages, currents and temperatures of battery 10. Some operations described herein, e.g., obtaining input parameters from a user and performing various calculations, may be performed by either main module 4 or power-management module 8, according to the specific implementation.

Battery 10 may be for example a lithium-ion (Li-ion) rechargeable battery responsible for energy and power accumulation and utilization. Battery 10 may be configured to have a full capacity that is larger than the consumable capacity in order to obtain an optimum charging and cycle-life performance, as described herein. Battery 10 may include a single rechargeable cell, a pack, or a module. A pack may include a set of any number of cells, different or identical, that may be interconnected in series, in parallel or a mixture of both, and a module may include several packs, typically connected in parallel. As used herein, the term full capacity, $C_{full}$, may refer to the total amount of charge stored by the battery, if configured to be fully charged, and the term consumable capacity, $C_{consumable}$, may refer to the amount of charge, or to a percentage of the full capacity, that the battery may store when allowed to charge up to a predetermined high charge level and discharge down to a predetermined low charge level. The range of charge between the low charge level and the high charge level may be referred to herein as the operational range.

Battery 10 may have a full capacity larger than a consumable capacity, wherein the consumable capacity may be defined by an operational range that is confined by a predetermined low charge level and a predetermined high charge level. For example, the consumable capacity may be less than or below 50% of the full capacity, e.g., 33% of the full capacity, and the operational range may be within 30-100% of the full capacity.

According to some embodiments of the present invention, during normal mode of operation, power-management module 8 may monitor a state of charge (SOC) of battery 10, limit the discharge level of battery 10 to the predetermined low charge level, and limit the charging level of battery 10 to the predetermined high charge level, thus confining the operational range of battery 10. As used herein SOC may refer to as the capacity remained in the battery expressed as a percentage of the full capacity of the battery. Power-management module 8 may monitor SOC of battery 10 continuously, e.g., detect or estimate SOC interminably (as long as power management module 8 operates) in predetermined intervals. During charging, power-management module 8 may provide a charging rate of at least 4 C, for at least part of or a portion of the duration of the charging operation. For example, power-management module 8 may provide an initial charging rate of at least 4 C for an initial phase of charging, and lower charging rates afterwards. As used herein, a rate of 1 C charges battery 10 in one hour.

Providing a battery 10 having a full capacity larger than the consumable capacity, and restricting the capacity of battery 10 during a normal mode of operation to the consumable capacity, may increase the charging rates of the battery in comparison to a battery having a full capacity equal to the consumable capacity (e.g., a smaller battery in which the capacity has not been restricted), since higher charging currents may be supplied to the larger battery. This effect alone may reduce charging rates at least proportionally to the increase in the full capacity. For example, if battery 10 has a full capacity three times larger than the consumable capacity, the charging current of battery 10 may be three times larger, resulting in three time faster charging rate, e.g., 3 C instead of 1 C. However, according to embodiments of the present invention, charging times of battery 10 may be further reduced as disclosed herein.

Limiting the operational range of a lithium-ion battery may increase the cycle-life of the battery, while increasing the charging rates may reduce the cycle-life. Embodiments of the present invention may provide a trade-off between these two opposite effects. By providing a battery having a full capacity larger than the consumable capacity, and configuring power management module 8 to enable usage of the consumable capacity only, the cycle-life of the battery may increase. According to embodiments of the present invention, this increase may be compromised by increasing the charging rate of the battery. Providing a charging rate of at least 4 C to battery 10 may reduce the cycle-life of battery 10. Thus, according to some embodiments of the invention, the predetermined low charge level, the predetermined high charge level and the charging rate or profile may be set so that an expected cycle-life of battery 10 may be a desired expected cycle-life of, e.g., at least 1200 cycles.

The relation between the cycle-life of a lithium-ion battery on the depth of discharge (DoD) is not linear, but as a rule of thumb, the deeper the depth of the discharge (in percentage), the lower the cyclability of the battery, as shown in Table 1 below.

TABLE 1

An example dependence of discharge cycles of a lithium-ion battery on the depth of discharge.

| Depth of Discharge (DoD) | Discharge Cycles |
| --- | --- |
| 100% DoD | 300-500 |
| 50% DoD | 1,200-1,500 |
| 25% DoD | 2,000-2,500 |
| 10% DoD | 3,750-4,700 |

From Table 1 it can be clearly seen that in one example using only 10% DoD of the battery results in a very high charge/discharge cycle life in comparison to 100% DoD.

For example, the predetermined low charge level, the predetermined high charge level and the charging current may be set so that an expected cycle-life of battery 10 may approximately equal an expected cycle-life of an equivalent lithium-ion battery having a full capacity equal to the consumable capacity and undergoing charge/discharge cycles between 0-100% charge. Additionally, providing a battery having a full capacity larger than the consumable capacity, and using the consumable capacity only, may increase charging rates in comparison to a battery having a full capacity equal to the consumable capacity also due to the lower internal resistance or equivalent series resistance (ESR) of the battery. The ESR value affects the charging process. Higher ESR values result in higher voltage drops, allowing less charging current to be used.

According to some embodiments of the invention, power-management module 8 may be configured to limit the range of operation of battery 10 during normal mode of operation as disclosed herein. However, power-management module 8 may be further configured to enable an emergency use mode to a user, and upon activation of the emergency use mode, enable battery 10 to discharge to below the predetermined low charge level, for example, enable up to 100% depth of discharge (DoD) of battery 10, where DoD is defined with relation to the full capacity. As used herein, the emergency use mode may refer to a situation in which battery 10 is allowed to discharge to below the predetermined low charge level, for example, to fully discharge.

Figure 2:
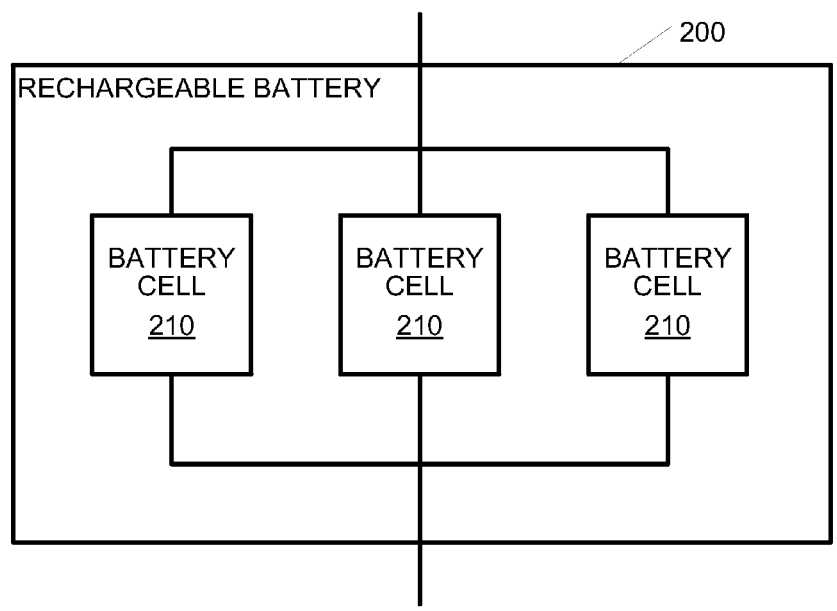
FIG. 2 is a schematic diagram illustrating an example of a battery, according to embodiments of the present invention.

Reference is now made to FIG. 2, which is a schematic diagram illustrating an example of a battery 200, according to embodiments of the present invention. As noted before, battery 10 may include a single rechargeable cell, a pack, or a module. In the example presented in FIG. 2, battery 200 includes three cells 210, interconnected in parallel. Connecting cells 210 in parallel may reduce ESR which may further increase charging rate and shorten charging time.

Figure 3:
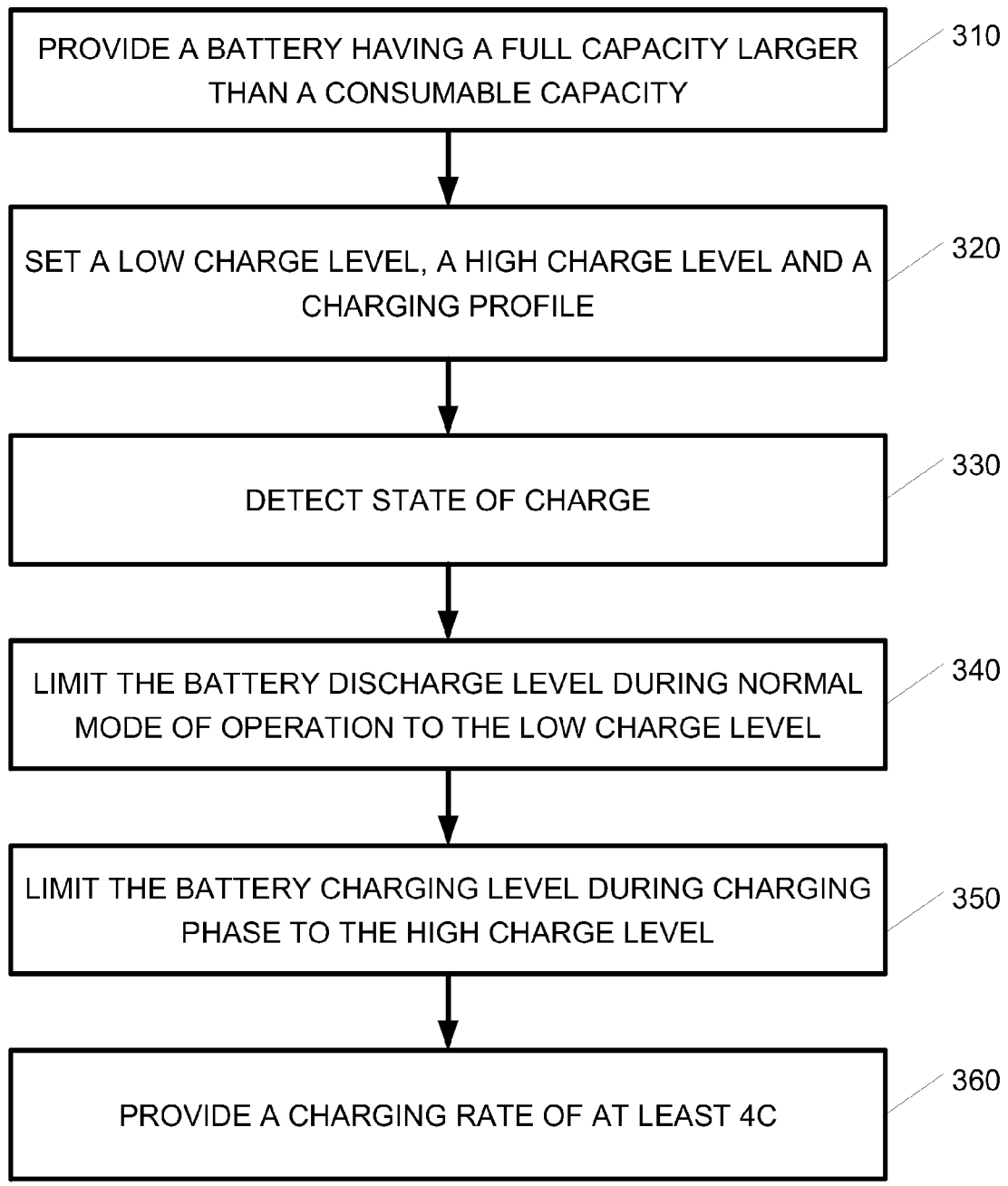
FIG. 3 is a flowchart illustration of a method for fast charging according to embodiments of the present invention.

Reference is now made to FIG. 3, which is a flowchart illustration of a method for fast charging according to embodiments of the present invention. Some of the operations presented in FIG. 3 may be performed, for example, by power module 8 depicted in FIG. 1, or alternately by another system.

In operation 310, a battery, e.g., battery 10, having a full capacity that is larger than the consumable capacity may be provided. For example, the consumable capacity may be below 50% of the full capacity, e.g., 33% of the full capacity. In operation 320, a predetermined low charge level, a predetermined high charge level and a charging profile may be set. According to some embodiments of the invention, the predetermined low charge level, the predetermined high charge level and the charging profile may be set so that an expected cycle-life of the battery may be a desired expected cycle-life e.g., at least 1200 cycles. According to some embodiments of the invention, the charging profile may include charging currents or voltages for providing charging rate of at least 4 C for at least part of or a portion of the charging process of the battery. For example, for a battery having a full capacity that is three times larger than the consumable capacity, the charging profile may include an initial charging rate of about 6 C for the first 60 seconds or more of the charging, followed by a charging rate of 0.6 C until that battery reaches the predetermined high charge level. It should be readily understood that other charging profiles may be provided. For example, the charging profile may include more than two charging phases, each with a different charging rate, as long as one of these charging phases includes charging rate of at least 4 C. Additionally, higher charging rates than 4 C or 6 C may be used, for example, changing rates higher than 10 C. In operation 330 SOC of the battery may continuously monitored. The state of charge may be detected or estimated according to any applicable method, as known in the art. During normal mode of operation, the battery discharge level may be limited to the predetermined low charge level, as indicated in operation 340. The discharge level may be limited to the predetermined low charge level by discontinuing or stopping discharge of the battery upon (e.g., at the time of or soon after) detecting that the battery is at or substantially at the predetermined low charge level. During charging, the battery charge level may be limited to the predetermined high charge level, as indicated in operation 350. The charge level may be limited to the predetermined high charge level by stopping or discontinuing the charging upon detecting that the battery is at or substantially at the predetermined high charge level. In operation 360, a charging rate of at least 4 C may be provided, e.g., by power management module 8, to the battery, according to the charging profile. The charging rate of at least 4 C may be provided for some or all of the charging process. For example, an initial charging rate of at least 4 C may be provided for an initial phase of charging, and lower charging rates may be provided afterwards.

Figure 4:
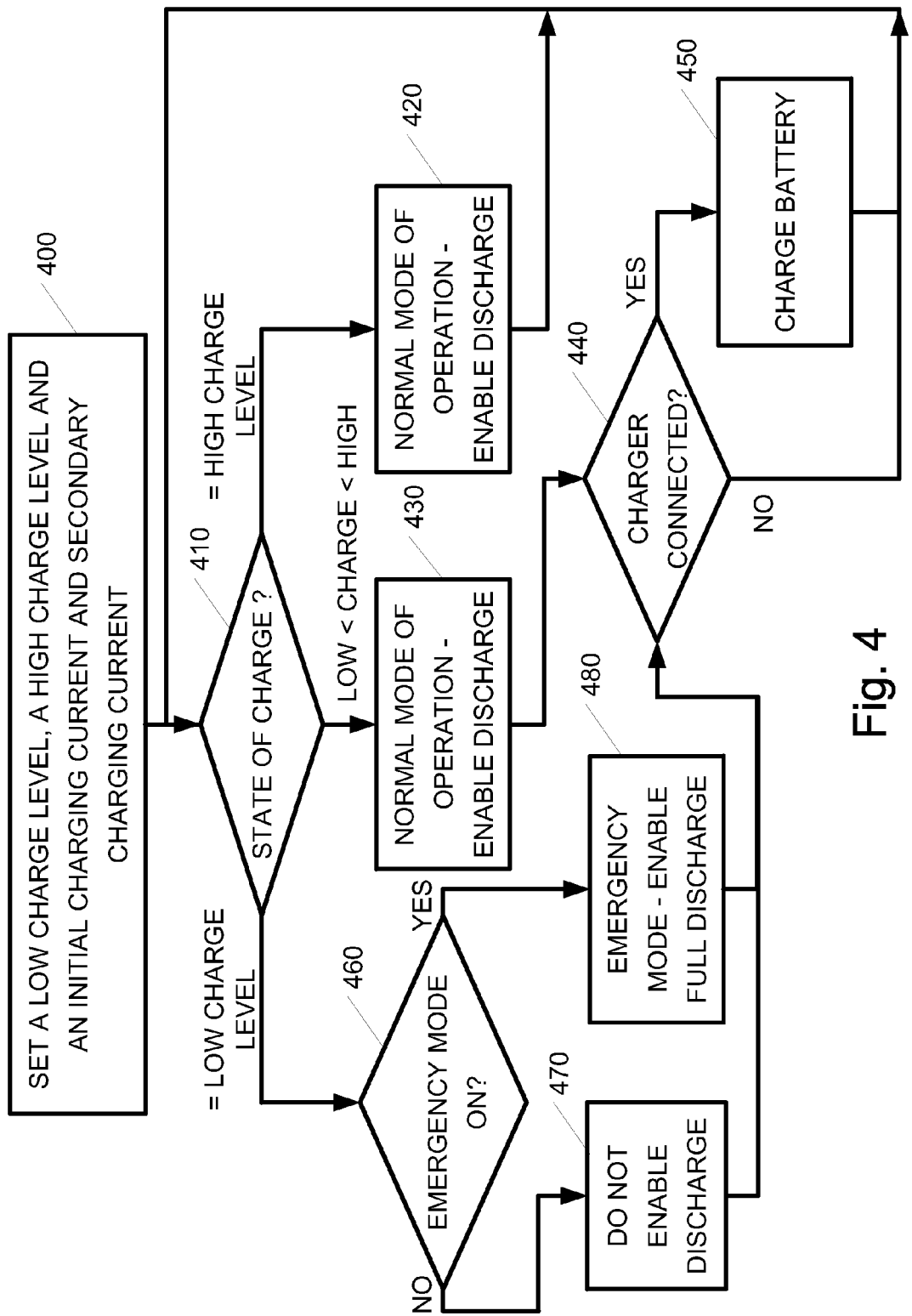
FIG. 4 is a flowchart illustration of a method for fast charging according to embodiments of the present invention.

Reference is now made to FIG. 4 which a flowchart illustration of a method for fast charging of according to embodiments of the present invention. The method presented in FIG.

4 may be performed, for example, by power management module 8 depicted in FIG. 1, or by another system. The method presented in FIG. 4 may be used for fast charging of a battery having a full capacity that is larger than the consumable capacity as disclosed herein, e.g., battery 10.

Operation 400 may be similar to operation 320 depicted in FIG. 3. In operation 410 a SOC of the battery may be continuously monitored. If the SOC is above the low charge level and below the high charge level, the battery may operate in the normal mode of operation, as indicated in operation 430. In the normal mode of operation, the battery may be allowed to discharge down to the low charging level, e.g., by providing power to a device. If, while in the normal mode of operation, it is detected in operation 440 that a charger is connected to power module 14, then in operation 450 the battery may be allowed to charge up to the high charging level as disclosed herein. For example, a charging rate of at least 4 C may be provided to the battery. The charging rate of at least 4 C may be provided for some or all of the charging according to the charging profile. For example, an initial charging rate of at least 4 C may be provided for an initial phase of charging, and lower charging rates may be provided afterwards.

If the SOC is at or near the high charge level, the battery may operate in the normal mode of operation, as indicated in operation 430, however, no charging is performed. If the SOC is at or near the low charge level, then in operation 460 it may be determined whether emergency use mode is enabled. For example, the emergency mode may be enabled by a user by preconfiguring a parameter. Additionally or alternatively, the user may be prompted with a question whether to enable the emergency use mode and may provide an answer, e.g., by input devices 35 depicted in FIG. 1. If the emergency use mode is enabled, the battery is allowed to discharge to below the low charge level, as indicated in operation 480. If the emergency use mode is disabled, the battery may be prevented of providing any power, thus substantially no further discharge of the battery is enabled, as indicated in operation 470. If the SOC is at or near the low charge level, and a charger is connected (operation 440), then in operation 450 the battery may be allowed to charge up to the high charging level.

An example battery according to embodiments of the present invention has been tested with relation to a standard lithium-ion battery having the same consumable capacity. The results of the comparison a presented hereinbelow in Table 2.

The typical smartphone battery that was tested has the following characteristics (other characteristics are possible):
Capacity: $C_{full}=C_{consumable}=2600$ mAh
Charging profile: 25% in 12 min., 100% in 96 min, resulting in average charging rate of ~0.6 C.
Expected cycle life: 500 cycles with 100% DoD The example battery in the exemplary embodiment has the following characteristics:
Capacity: $C_{full}=7800$ mAh; $C_{consumable}=2600$ mAh (thus the consumable capacity is about 33% of the full capacity)
Low charge level=67%, high charge level=100%
Charging profile: 33% of $C_{consumable}$ in 1 min. (i.e., 860 mAh, 6 C), 100% in 27 min. (i.e., 2600 mAh), resulting in total charging rate of ~0.6 C (where C rate is defined with relation to the full capacity).
Expected Cycle life: 500 cycles with 100% DoD (where DoD is defined with relation to the consumable capacity). As disclosed herein, the expected cycle-life is a result of the low charge level, the high charge level and the charging profile.

Emergency use option: allows the use of up to an additional 5400 mAh capacity to $C_{consumable}$ The parameters listed above are summarized in Table 1 below.

TABLE 2

Comparison of properties such as charge profile, cycle life, and emergency use option of a typical smartphone battery versus a battery according to embodiments of the present invention.

| Performance Parameters | Typical Smartphone Battery | Fast-Charge Battery (FCB) |
|---|---|---|
| Capacity ($C_{consumable}$) | 2600 mAh | 2600 mAh |
| After 1-minute charge time | 2% of $C_{consumable}$ is charged (52 mAh) | 33% of $C_{consumable}$ is charged (866 mAh) |
| After 27-minute charge time | ~54% of $C_{consumable}$ is charged (1400 mAh) | 100% of $C_{consumable}$ is charged (2600 mAh) |
| Cycle life | 500 cycles | 500 cycles |
| Emergency use option | Doesn't exist | Exists |

Thus, in one example the battery charges at about 27 minutes, while the typical smartphone battery charges at 96 minutes.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and some embodiments not specifically described may include various features described herein.

The invention claimed is:

1. A system for fast charging of a lithium-ion battery, the system comprising:
a power management module configured to:
continuously monitor a state of charge (SOC) of the lithium-ion battery;
during a normal mode of operation and upon detecting that the battery is at the predetermined low charge level, discontinuing discharge of the battery;
upon detecting that the battery is connected to a charger, providing charging rate of at least 4 C for at least part of charging of the battery; and
upon detecting that the battery, while connected to the charger, is at the predetermined high charge level, discontinuing the charging,
wherein the predetermined low charge level and the predetermined high charge level define a consumable capacity of the battery, wherein a full capacity of the battery is at least three times larger than the consumable capacity.

2. The system of claim 1, wherein the system further comprises the battery.

3. The system of claim 1, wherein the predetermined low charge level, the predetermined high charge level and the charging rate are set so that an expected cycle-life of the battery is at least about 1200 cycles.

4. The system of claim 1, wherein the battery comprises a plurality of battery cells connected in parallel.

5. The system of claim 1, wherein the power management module is further configured to provide an initial charging rate of substantially 6 C for at least 60 seconds of the charging.

6. The system of claim 5, wherein the power management module is further configured to provide a charging rate of 0.5 C for a second charging phase.

7. The system of claim 1, wherein the power management module is further configured to:
enable an emergency use mode to a user; and
upon activation of the emergency use mode, enable up to 100% depth of discharge of the battery.

8. The system of claim 1, wherein the system further comprises a charger, wherein the power management module is further configured to provide the charging rate of at least 4 C for at least part of charging of the battery by instructing the charger to provide the required current level.

9. A method for fast charging of a lithium-ion battery, the method comprising:
continuously monitoring a state of charge (SOC) of the lithium-ion battery;
during a normal mode of operation and upon detecting that the battery is at the predetermined low charge level, discontinuing the discharge;
upon detecting that the battery is connected to a charger, providing charging rate of at least 4 C for at least part of charging; and
upon detecting that the battery, while connected to the charger is at the predetermined high charge level, discontinue the charging,
wherein the predetermined low charge level and the predetermined high charge level define a consumable capacity of the battery, wherein a full capacity of the battery is at least three times larger than the consumable capacity.

10. The method of claim 9, wherein the predetermined low charge level, the predetermined high charge level and the charging rate are set so that an expected cycle-life of the battery is at least 1200 cycles.

11. The method of claim 9, wherein the battery comprises a plurality of battery cells connected in parallel.

12. The method of claim 9, wherein an initial charging rate of substantially 6 C is provided for at least 60 seconds of the charging.

13. The method of claim 12, wherein a second charging rate of substantially 0.5 C is provided for rest of the charging.

14. The method of claim 9, further comprising:
enabling an emergency use mode to a user; and
upon activation of the emergency use mode, enabling up to 100% depth of discharge of the battery.

15. The method of claim 9, wherein providing the charging rate of at least 4 C for at least part of charging of the battery comprises instructing the charger to provide the required current level.

16. A system for fast charging of a lithium-ion battery, the system comprising:
a controller configured to:
detect a state of charge of the lithium-ion battery;
limit the battery charge and discharge levels during normal mode of operation to a predetermined operational range; and
provide an initial charging rate of at least 4 C for an initial phase of charging,
wherein the operational range define a consumable capacity of the battery, such that a full capacity of the battery is at least three times larger than the consumable capacity.

* * * * *